United States Patent [19]
Faisst

[11] Patent Number: 5,116,161
[45] Date of Patent: May 26, 1992

[54] CORNER JOINT BETWEEN TWO SECTIONS HAVING A C-SHAPED ATTACHING PORTION BY MEANS OF A CORNER CONNECTOR, AND ANGLE PIECE FOR PRODUCING THE JOINT

[75] Inventor: Dieter Faisst, Winterthur, Switzerland

[73] Assignee: Alusuisse-Lonza Services, Ltd., Zurich, Switzerland

[21] Appl. No.: 678,600

[22] Filed: Apr. 1, 1991

[30] Foreign Application Priority Data

Apr. 11, 1990 [CH] Switzerland ............... 01246/90

[51] Int. Cl.⁵ .................................................. F16B 9/00
[52] U.S. Cl. ................................... 403/231; 403/403; 411/84; 411/85
[58] Field of Search ............... 403/403, 231, 187, 363, 403/, 205, 292; 411/84, 85, 104; 52/657; 296/29, 30, 203

[56] References Cited

U.S. PATENT DOCUMENTS

| 3,429,601 | 2/1969 | Bremers | 411/84 X |
| 3,669,479 | 6/1972 | Payne | |
| 3,695,649 | 10/1972 | Lavergne | 411/231 |
| 4,641,987 | 2/1987 | Schlegel | 403/205 X |
| 4,655,010 | 4/1987 | Arquati | 403/403 X |
| 4,950,099 | 8/1990 | Roellin | 411/85 X |

FOREIGN PATENT DOCUMENTS

| 2600816 | 7/1976 | Fed. Rep. of Germany | 403/231 |
| 782428 | 9/1957 | United Kingdom. | |
| 2007324 | 5/1979 | United Kingdom. | |
| 2087507 | 5/1982 | United Kingdom | 403/403 |

Primary Examiner—Randolph A. Reese
Assistant Examiner—Heather Chun
Attorney, Agent, or Firm—Bachman & LaPointe

[57] ABSTRACT

A corner connector connects two sections to one another, which sections are at right angles to one another and have C-shaped attaching portions. The sections have two section legs and two webs projecting inwards two at a time from the section legs. The corner connector consists of two angle plates, two wedge rails, four screws and associated parallelogram nuts. The plates each have two grooves, which accommodate the webs in a form-fitting manner, and wedge surfaces on the opposite sides. The nuts grip behind the webs. The plates are spread by the wedge rails clamped against the nuts by the screws. High bending and tensile strength of the joint is achieved by this design.

9 Claims, 3 Drawing Sheets

CORNER JOINT BETWEEN TWO SECTIONS HAVING A C-SHAPED ATTACHING PORTION BY MEANS OF A CORNER CONNECTOR, AND ANGLE PIECE FOR PRODUCING THE JOINT

BACKGROUND OF THE INVENTION

German Patent 2,751,753 discloses a corner joint and an angle piece. The corner joint disclosed in the German patent includes a first section having a C-shaped attaching portion and a second section arranged at an angle thereto and having a C-shaped attaching portion by means of a corner connector. The joint is used in particular for producing coach body shells of extruded sections. The sections to be joined have one or more C-shaped attaching portions having two parallel section legs and webs integrally formed on the free leg ends and directed towards one another. The corner connector has two legs which are at right angles to one another and bear against the outer surfaces of the section webs. The connector legs each have two through-holes through which screws are inserted. The screws are screwed into parallelogram nuts which grip with their short sides behind the section webs. This known corner connector permits rapid and precise assembly and has proved very successful. However, it has the disadvantage that it can transmit only slight bending forces in the direction perpendicular to the common plane of the two sections. Coach bodies which are produced with these known corner connectors are therefore less resistant to bending in the transverse direction of the coach body.

SUMMARY OF THE INVENTION

The object of the present invention is to design a corner joint and an angle piece in such a way that greater bending moments can be transmitted via the corner joint. This object is achieved by the features of the present invention.

The present invention comprises a corner joint between a first section having a C-shaped attaching portion and a second section arranged at an angle thereto and having a C-shaped attaching portion by means of a corner connector which has two legs which bear against the two sections and are each screwed to the sections by means of at least one screw and an associated parallelogram nut, in which arrangement the sections have two parallel section legs and a first web on each of the two section legs on its side facing the other prospective section leg, and the nut grips behind the two first webs of the associated section and its width is less than the distance between the two first webs, characterized in that the corner connector consists of two angle pieces which are moveable relative to one another and which, along their legs bearing against the sections, each have a groove on the side remote from the complimentary angle piece and a wedge surface on the opposite side, in that the two sections each have on the two section legs a second web parallel to the first web, in that the second webs engage in a form-fitting manner in the grooves of the angle pieces, and in that the angle pieces are spread apart by at least one wedge rail which bears against the wedge surfaces and is clamped against the associated section by the screws.

The present invention also comprises an angle piece for a corner connector for producing a joint as defined above having two legs arranged at an angle to one another and an outer surface parallel to the plane defined by the legs, characterized in that the legs have rectilinear grooves which start from the outer surface and are limited by strips which are set back relative to the outer surface, and in that the legs, on the side opposite the outer surface, each have a wedge surface inclined relative to the outer surface and parallel to the longitudinal direction of the associated groove.

BRIEF DESCRIPTION OF THE DRAWINGS

An exemplary embodiment of the invention is explained below with reference to the drawing, in which.

DETAILED DESCRIPTION

Figure 1:
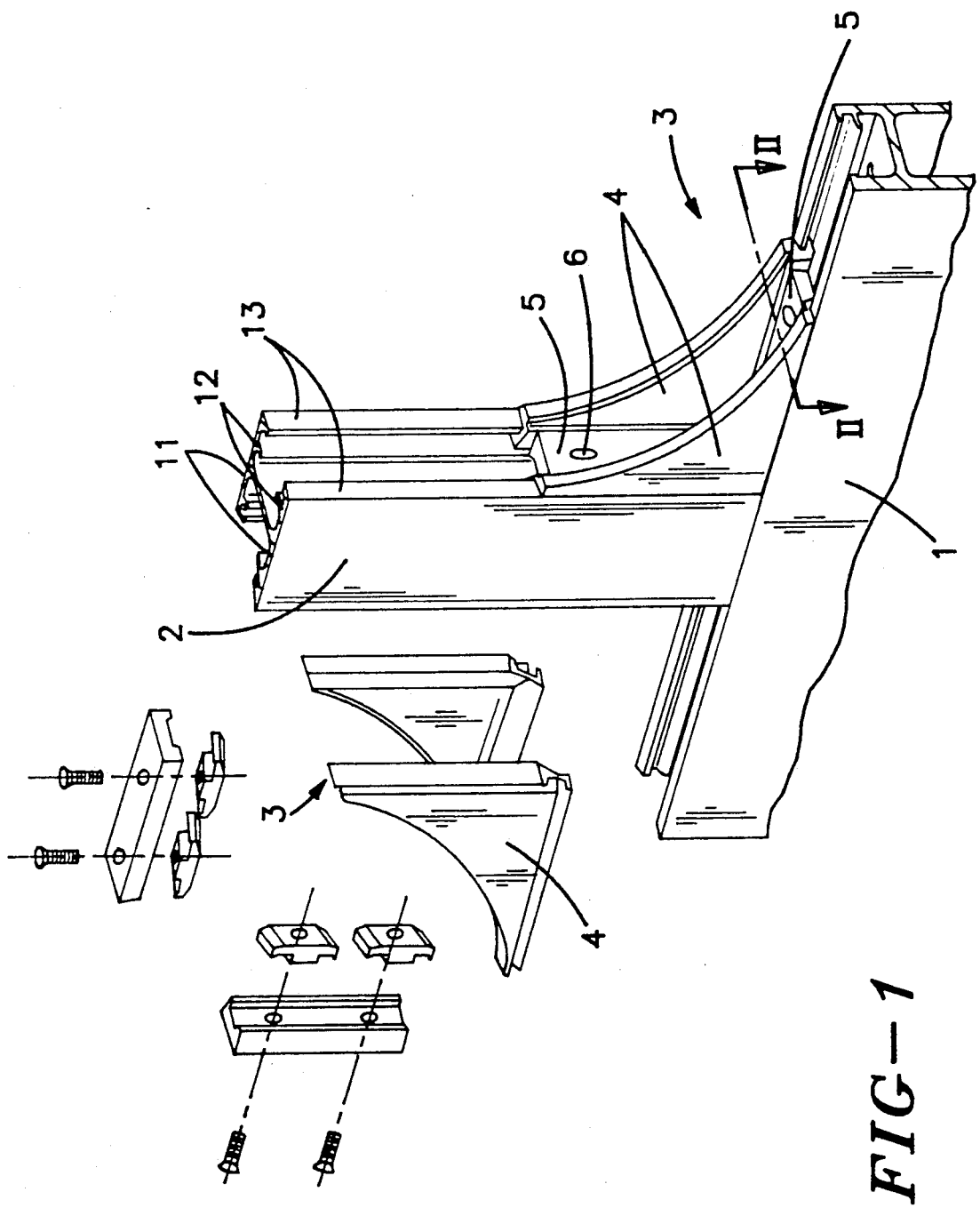
FIG. 1 shows a perspective view of a corner joint.

A corner joint between a continuous, horizontal first section 1 and a vertical second section 2, e.g. a window pillar of a coach body shell, which second section 2 adjoins the first section 1 in a butt-jointed manner, is shown diagrammatically in FIG. 1. The sections 1, 2 are conveniently extruded from an aluminum alloy. The joint is produced by means of two corner connectors 3 which each consist of two angle plates 4, two wedge rails 5, four screws 6 and four parallelogram nuts 7. The section 1 can also form, for example, the margin of a sandwich panel.

Figure 2:
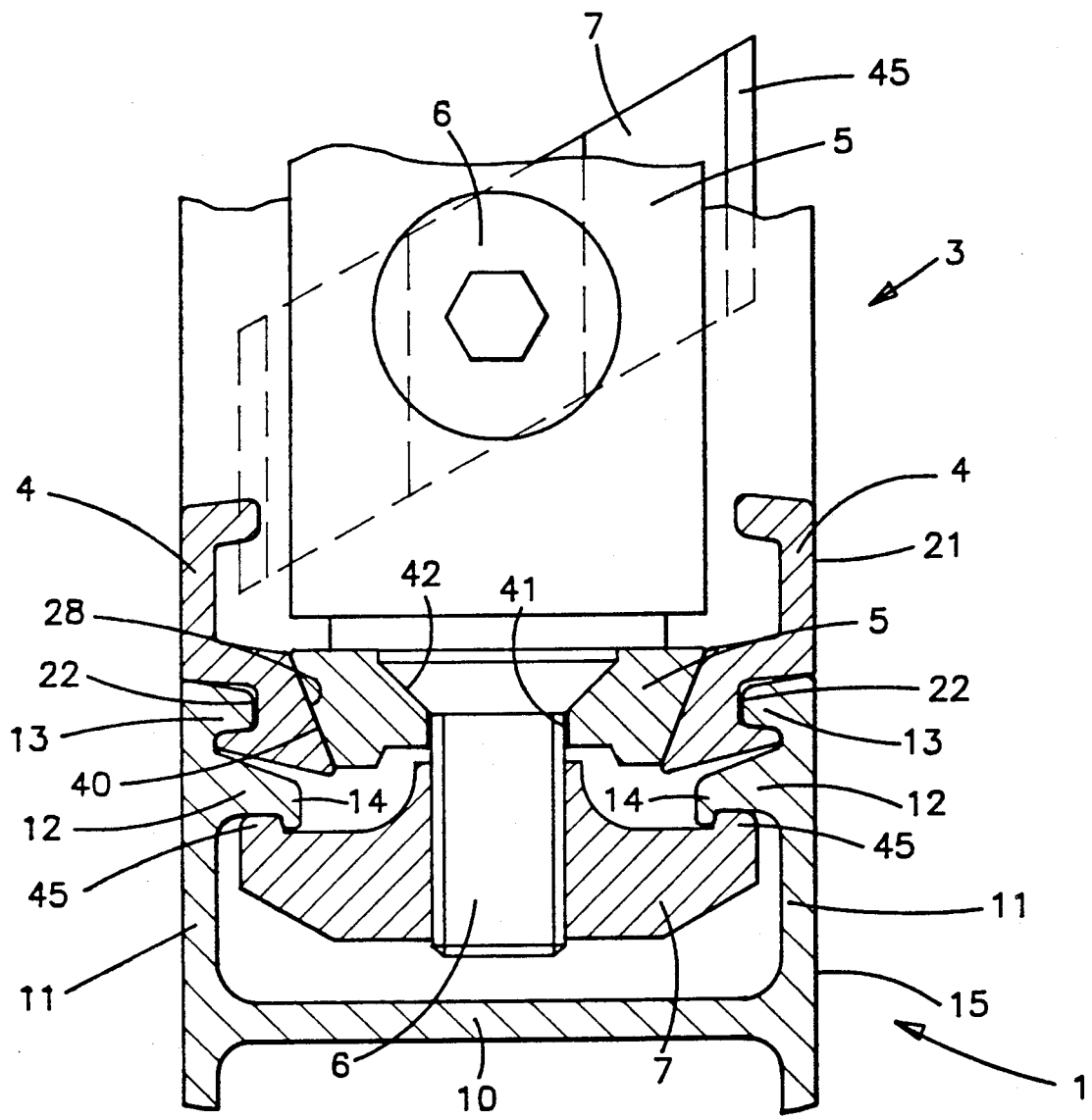
FIG. 2 shows a cross-section through the corner joint.

A cross-section through the joint according to FIG. 1 is shown in FIG. 2. The section 1 has at least one C-shaped attaching portion having a base 10, two parallel legs 11 integrally formed thereon and two webs 12, 13 each projecting inwards at the leg ends. At their free ends, the webs 12 have a nose 14 directed towards the base 10. The webs 13 are narrowed slightly in a wedge shape towards their free end.

Figure 4:
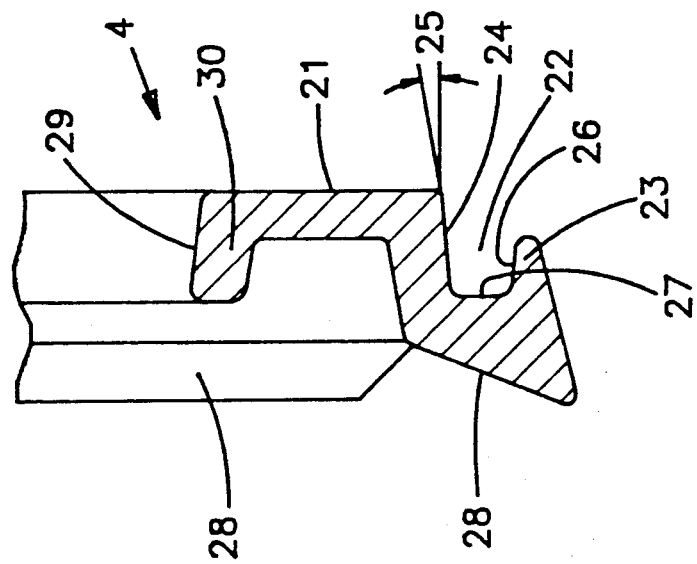
FIG. 4 shows a section along the line IV—IV in FIG. 3 to an enlarged scale.
Figure 3:
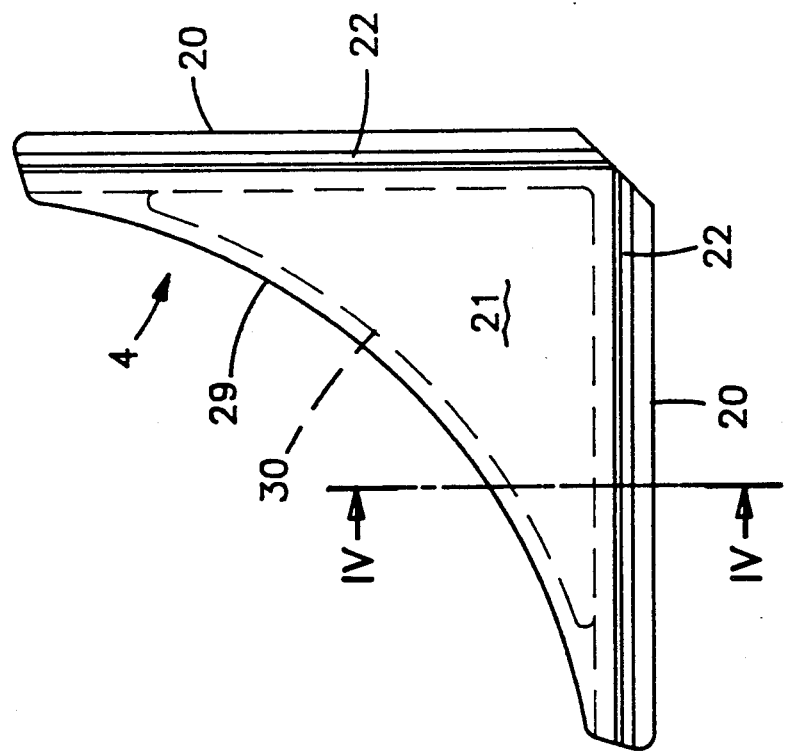
FIG. 3 shows a side view of the angle piece.

Along their two legs 20 bearing against the sections 1,2, the angle plates 4 (FIGS. 3 and 4), starting from their outer surface 21, have a rectilinear groove 22 which is terminated by a strip 23. The strip 23 is set back relative to the plane of the outer surface 21. The flank 24 of the groove 22, which flank 24 starts from the outer surface 21, is inclined by an angle 25 of about 5° relative to the perpendicular to the outer surface 21. The opposite flank 26 is approximately perpendicular to the plane of the outer surface 21. The groove root 27 is at a distance from the outer surface 21 which is slightly greater than the width of the web 13. On the side remote from the outer surface 21, each leg 20 has a wedge surface 28 running parallel to the groove 22 and inclined by an angle of about 20°0 to the outer surface 21. The base 29 of the angle plate 4 is curved in a quadrant shape and has a reinforcing rib 30. The angle plate 4 is conveniently drop-forged from an aluminum alloy. High strength can thereby be achieved.

To produce the joint, two angle plates 4 are pushed with their grooves 22 into the webs 13 of the two sections 1, 2 and are then each secured by a wedge rail 5. The wedge rails 5 bear with their wedge surfaces 40 against the wedge surfaces 28 of the angle plates 4. They have two through holes 41 with conical countersinks 42 for accommodating the head of the countersunk screws 6. The meshing of the threads between screw 6 and parallelogram nut 7 is self-locking. When the screws 6 are turned, first of all the nut 7, originally inserted with its longitudinal sides parallel to the longitudinal extent of the sections 1, 2, is therefore also turned until its narrow sides bear against the inside of the section legs 11. The nut 7 is then tightened against the webs 12, in the course of which they each grip with a projection 45 along their narrow sides behind the noses 14 of the webs 12. This prevents the legs 11 from being spread by the action of the wedge rail 5 when the screw 6 is tightened. In the assembled state, the outer surfaces 21 of the angle plates 4 are flush with the outer surfaces 15 of the profile legs 11.

When the screws 6 are tightened, the webs 13 are wedged in the grooves 22 in a form-fitting and self-locking manner. The transmission of force between the sections 1, 2 is therefore effected via the angle plates 4 directly into the section webs 11. High bending moments in both directions and considerably tensile forces between the sections 1, 2 can thereby be transmitted.

The corner joint described is suitable in particular for the construction of coach body shells for rail vehicles and buses and, on account of its high strength, enables such shells to be designed for roll-over protection.

Instead of the two wedge rails 5, a single wedge rail folded in an L-shape can also be used. This has the advantage that the corner connector has one component fewer.

I claim:
1. Corner joint which comprises:
   a first section having a C-shaped attaching portion and a second section arranged at an angle thereto and having a C-shaped attaching portion, wherein said first and second sections each have two parallel section legs and a first inwardly facing web on each of the two section legs;
   a corner connector consisting of two angle pieces each having two legs which bear against the two sections and each having a complementary angle piece;
   at least one screw and an associated parallelogram nut associated with each angle piece operative to screw the angle piece to the sections, wherein the nut grips behind the two first webs of the associated section;
   wherein said two angle pieces are separate and moveable relative to one another, and wherein the legs of the angle pieces bear against the first and second sections and each leg of said angle piece has a groove on the side remote from the complimentary angle piece and a wedge surface on the side opposed to said groove;
   a second web on each of the two section legs parallel to the first web wherein said second webs engage in a form-fitting manner in the grooves of the angle pieces; and
   at least one wedge rail which bears against the wedge surfaces and is clamped by the screws, wherein the angle pieces are spread apart by the wedge rail.

2. Corner joint according to claim 1 wherein the first webs each have a nose and the parallelogram nuts each have a projection gripping behind the noses.

3. Corner joint according to claim 1 wherein said grooves and second webs are designed in a wedge shape.

4. Corner joint according to claim 3 wherein the grooves and second webs have wedge angles and wherein the grooves and second webs are assembled in a form-fitting manner.

5. Angle piece for a corner connector for producing a joint according to claim 1 having two legs arranged at an angle to one another and ann outer surface parallel to a plane defined by the legs, wherein the legs have rectilinear grooves which start from the outer surface and are limited by strips which are set back relative to the outer surface, and in that the legs, on the side opposite the outer surface, each have a wedge surface inclined relative to the outer surface and parallel to the longitudinal direction of the associated groove.

6. Angle piece according to claim 5 wherein the grooves have a wedge-shaped cross-section.

7. Angle piece according to claim 6 wherein the wedge angle of the grooves is about 5°.

8. Angle piece according to claim 5 wherein said angle piece is drop-forged.

9. Angle piece according to claim 5 consisting of an aluminum alloy.

* * * * *